United States Patent
Larson et al.

(10) Patent No.: US 7,757,017 B2
(45) Date of Patent: Jul. 13, 2010

(54) ADJUSTING DIRECTION OF DATA FLOW BETWEEN I/O BRIDGES AND I/O HUBS BASED ON REAL TIME TRAFFIC LEVELS

(75) Inventors: Chad J. Larson, Austin, TX (US); Ricardo Mata, Jr., Pflugerville, TX (US); Michael A. Perez, Cedar Park, TX (US); Steven Vongvibool, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/748,781

(22) Filed: May 15, 2007

(65) Prior Publication Data

US 2008/0285457 A1 Nov. 20, 2008

(51) Int. Cl.
- G06F 3/00 (2006.01)
- G06F 5/00 (2006.01)
- G06F 11/00 (2006.01)
- G01R 31/08 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ............... 710/29; 710/38; 370/237
(58) Field of Classification Search ............ None
See application file for complete search history.

(56) References Cited

U.S. PATENT DOCUMENTS

| | | | |
|---|---|---|---|
| 5,367,523 A | 11/1994 | Chang et al. | |
| 5,499,384 A | 3/1996 | Lentz et al. | |
| 5,550,989 A | 8/1996 | Santos | |
| 5,572,690 A | 11/1996 | Molnar et al. | |
| 5,742,587 A * | 4/1998 | Zornig et al. | 370/235 |
| 6,636,487 B1 * | 10/2003 | Roy | 370/260 |
| 6,754,228 B1 | 6/2004 | Ludwig | |
| 6,963,537 B2 | 11/2005 | Mor et al. | |
| 7,027,451 B1 * | 4/2006 | Chiang | 370/404 |
| 7,126,956 B2 | 10/2006 | Scholten | |
| 2003/0227942 A1 | 12/2003 | Maher, III et al. | |
| 2005/0002392 A1 * | 1/2005 | Vijeh et al. | 370/389 |

* cited by examiner

*Primary Examiner*—Henry W. H. Tsai
*Assistant Examiner*—Kris Rhu
(74) *Attorney, Agent, or Firm*—Stephen R. Tkacs; Stephen J. Walder, Jr.; Diana R. Gerhardt

(57) ABSTRACT

Mechanisms for adjusting direction of data flow between input/output (I/O) bridges and I/O hubs based on real time traffic levels are provided. The mechanisms of the illustrative embodiments provide firmware and/or hardware for monitoring data flow through an I/O bridge loop and corresponding I/O hub in order to determine if a condition exists requiring reassignment of the direction each I/O bridge sends its data. In particular, the firmware/hardware determines whether a current traffic condition through the I/O bridges and I/O hub meets criteria indicative of one pathway through the I/O bridge loop being over-utilized while another pathway through the I/O bridge loop is under-utilized. If it is determined that such a condition exists, the configuration of the I/O bridges may be automatically modified to reassign which pathway is utilized by the I/O bridge in sending/receiving I/O data traffic through the I/O bridge loop.

15 Claims, 4 Drawing Sheets her US 7,757,017 B2

ADJUSTING DIRECTION OF DATA FLOW BETWEEN I/O BRIDGES AND I/O HUBS BASED ON REAL TIME TRAFFIC LEVELS

BACKGROUND

1. Technical Field

The present application relates generally to an improved data processing system and method. More specifically, the present application is directed to a system and method for adjusting direction of data flow between input/output (I/O) bridges and I/O hubs based on real time traffic levels.

2. Description of Related Art

As the number of input/output (I/O) slots in a data processing system increases, more of the slots are moved from the central electronic complex (CEC), which houses the electronics, including the multi-chip modules, processing units, and the like, for performing high-speed computing associated with the data processing system, to external I/O drawers. To connect the I/O drawers to the CEC, the I/O functionality is typically separated into two parts, the I/O hubs and the I/O bridges. The I/O hubs are the devices in the I/O path that are directly connected to the CEC. I/O bridges are the devices, usually integrated circuit chips, in the I/O drawers that connect with the I/O hubs. Depending on the I/O drawer design, there may be one or multiple I/O bridges per I/O drawer.

In theory, an administrator may connect any number of I/O bridges to a single I/O hub in a loop configuration. In actuality, there is typically a limit placed on the number of I/O bridges that may be connected to an I/O hub, such as 32 I/O bridges per I/O hub, dependent upon the particular architecture and communication protocol used by the data processing system.

As mentioned above, the I/O bridges are typically connected to the I/O hub in a loop configuration, such as shown in FIG. 1. As shown in FIG. 1, the central electronics complex (CEC) 110 is coupled to the I/O hub 120. A plurality of I/O bridges 130-140 or a plurality of I/O drawers 150-160 are coupled to the I/O hub 120 in a loop configuration. Within the loop configuration, each I/O bridge 130-140 is coupled in series to at least one other I/O bridge with two of the I/O bridges 130 and 140 being also coupled to the I/O hub 120. Each I/O bridge 130-140 provides connection to one or more I/O slots of a corresponding I/O drawer 150-160.

As shown in FIG. 1, each I/O bridge 130-140, by virtue of the loop configuration, has two directions in which data may be sent. For example, the I/O bridge 134 may send data in the direction of I/O bridge 132 (counter-clockwise in the figure) or I/O bridge 136 (clockwise in the figure) toward the I/O hub 120. Similarly, I/O bridge 138 may send data in the direction of I/O bridge 136 or I/O bridge 140. Ideally the I/O bridges 130-140 are divided up during configuring of the data processing system such that half of the I/O bridges will send data in one direction while the other half of the I/O bridges will send data in the other direction.

Ideally, an administrator will balance out the data processing system I/O load so that the workload from I/O adapters is evenly divided between data flow directions. Unfortunately, however, administrators do not always configure the data processing system in that way or the data rates will vary based on the current workload. For example, at night, a server data processing system may be performing a backup operation using Fibre Channel I/O adapters provided in one or more I/O drawers 150-160 and I/O bridges 130-140. In the morning, the server data processing system may be performing video conferencing with high end graphics processing which may be handled by a different I/O adapter, I/O drawer 150-160, and I/O bridges 130-140. In the afternoon, there may be a higher level of network traffic through yet another I/O adapter, I/O drawer(s) 150-160, and I/O bridge(s) 130-140. Thus, dependent upon the particular workload at different times, the amount and rate at which data is passing through particular I/O bridges 130-140 may be quite different and thus, the balance of the data flowing in the two different directions may often be disrupted from an ideal condition.

As a result, one direction of data flow through the loop of I/O bridges 130-140 to the I/O hub 120 is under-utilized while the other direction of data flow may be over-utilized. Thus, the overall performance bandwidth of the I/O hub 120 and the I/O bridge loop is not maximized in known data processing system architectures.

SUMMARY

In one illustrative embodiment, a method for balancing data traffic across a plurality of data traffic lanes is provided. The method may comprise retrieving, at an input/output (I/O) hub, data traffic measurement information for a plurality of ports of the I/O hub and determining, by the I/O hub, if a data traffic lane is over-utilized based on the retrieved data traffic measurement information. The method may further comprise identifying, by the I/O hub, at least one I/O bridge associated with an over-utilized data traffic lane, in response to a determination that a data traffic lane is over-utilized, which can be reconfigured to direct data flow to an under-utilized data traffic lane of the plurality of data traffic lanes. Moreover the method may comprise reconfiguring, by the I/O hub, the at least one I/O bridge associated with the over-utilized data traffic lane to utilize a different data traffic lane in response to identifying the at least one I/O bridge.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a data processing system is provided. The data processing system may comprise an input/output (I/O) hub having a plurality of ports, wherein the I/O hub comprises a data traffic monitoring module and a data traffic balancing module, and a plurality of I/O bridges coupled to the plurality of ports of the I/O hub. The data traffic monitoring module may retrieve data traffic measurement information for the plurality of ports of the I/O hub and may determine if a data traffic lane, of a plurality of data traffic lanes, is over-utilized based on the retrieved data traffic measurement information. The data traffic balancing module may identify at least one I/O bridge associated with an over-utilized data traffic lane, in response to a determination that a data traffic lane is over-utilized by the data traffic monitoring module, which can be reconfigured to direct data flow to an under-utilized data traffic lane of the plurality of data traffic lanes. Moreover, the data traffic balancing module may reconfigure the at least one I/O bridge associated with the over-utilized data traffic lane to utilize a different data traffic lane in response to identifying the at least one I/O bridge.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide a system and method for adjusting a direction of data flow between input/output (I/O) bridges and I/O hubs based on real time traffic levels. The mechanisms of the illustrative embodiments may be implemented in any data processing device that utilizes an I/O hub and a plurality of I/O bridges coupled to the I/O hub such that a plurality of pathways or lanes from the I/O bridges to the I/O hub are available to each of the I/O bridges. The example implementations set forth hereafter will assume an I/O bridge loop configuration is utilized with the I/O hub, but this is only exemplary and is not limiting of the present invention. To the contrary, any architecture in which balancing of data traffic through I/O bridges to an I/O hub across a plurality of pathways or lanes may make use of the mechanisms of the illustrative embodiments without departing from the spirit and scope of the present invention.

Figure 1:
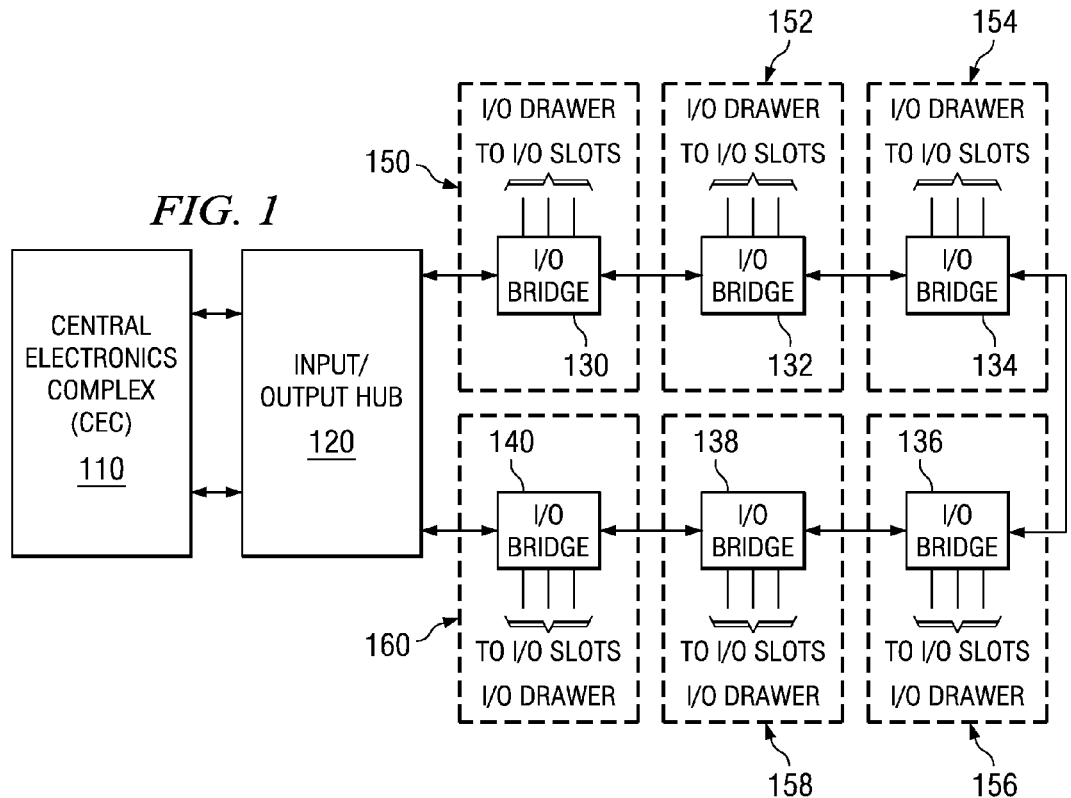
FIG. 1 is an exemplary diagram illustrative of a known I/O hub and I/O bridge loop.
Figure 2:
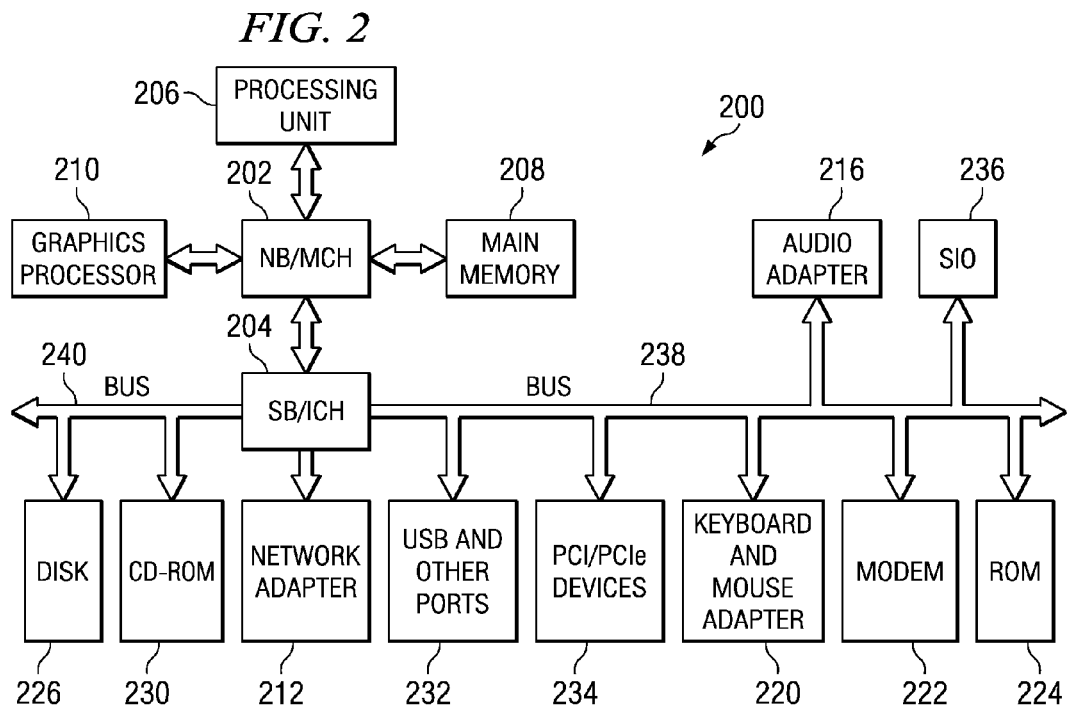
FIG. 2 is an exemplary representation of an exemplary data processing system in which aspects of the illustrative embodiments may be implemented.

With reference now to the figures and in particular with reference to FIG. 2, an exemplary diagram of a data processing device is provided in which illustrative embodiments of the present invention may be implemented. It should be appreciated that FIG. 2 is only exemplary and is not intended to assert or imply any limitation with regard to the environments in which aspects or embodiments of the present invention may be implemented. Many modifications to the depicted environment may be made without departing from the spirit and scope of the present invention.

FIG. 2 provides a block diagram of an exemplary data processing system in which aspects of the illustrative embodiments may be implemented. Data processing system 200 is an example of a computer, such as a server, a client computing device, host system, or the like, in which firmware or hardware implementing the functionality and operations of the illustrative embodiments may be located. In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As discussed above, the data processing system 200 may include I/O hubs 202 and 204. One or more of these I/O hubs 202 and 204 may make use of an I/O bridge loop through which I/O slots in which I/O adapters and/or devices may be accessed. For example, I/O hub 204 may utilize an I/O bridge loop in which a plurality of I/O bridges are provided in association with a plurality of I/O drawers that provide access to a plurality of I/O slots, e.g., Peripheral Component Interconnect (PCI) slots. In this way, the I/O adapters and/or devices 212, 216, and 220-236 may be provided via I/O slots in a plurality of I/O drawers (not shown) which each comprise one or more I/O bridges. In one illustrative embodiment, each I/O drawer comprises two I/O bridges and a plurality of I/O slots.

Each I/O bridge has two possible pathways, or lanes, of data traffic that may be followed for transferring data to/from an associated I/O hub, e.g., I/O hub 204. These two possible lanes of data traffic are referred to herein as the primary lane and the alternate lane. When the data processing system is initialized, the I/O hub 204 configures the I/O bridges and the ports of the I/O hub 204 such that there is an even split of data traffic between the I/O bridges. That is, approximately half of the I/O bridges use the primary lane to transfer data to/from the I/O hub 204 while the other half of the I/O bridges use the alternate lane to transfer data to/from the I/O hub 204. Under ideal conditions, all of the I/O bridges and I/O slots would have the same data throughput at all times thereby allowing even distribution of data traffic on both the primary and alternate lanes. However, in reality, data throughput is not the same at all times. Thus, the mechanisms of the illustrative embodiments adjust data flows through the I/O bridges and the I/O hub so as to adjust the lanes utilized by each of the I/O bridges in order to balance the data traffic across the lanes.

With the mechanisms of the illustrative embodiments, each I/O slot of an I/O bridge is assigned a node identifier (Node ID). This Node ID is an identifier that informs the I/O hub 204 where data is intended to go and which lane to take in order to get there. The mechanisms of the illustrative embodiments determine if conditions exist that indicate that the data traffic is not balanced across the lanes of data traffic. If such a condition exists, these Node IDs are used to identify which I/O bridges are furthest from a port, corresponding to a particular lane of traffic, of the I/O hub 204 and reassign the I/O bridge to the other of the primary and alternate lane in order to balance data traffic across the lanes. In this way, the performance bandwidth of the I/O hub 204 and the I/O bridge loop may be maximized.

Figure 3:
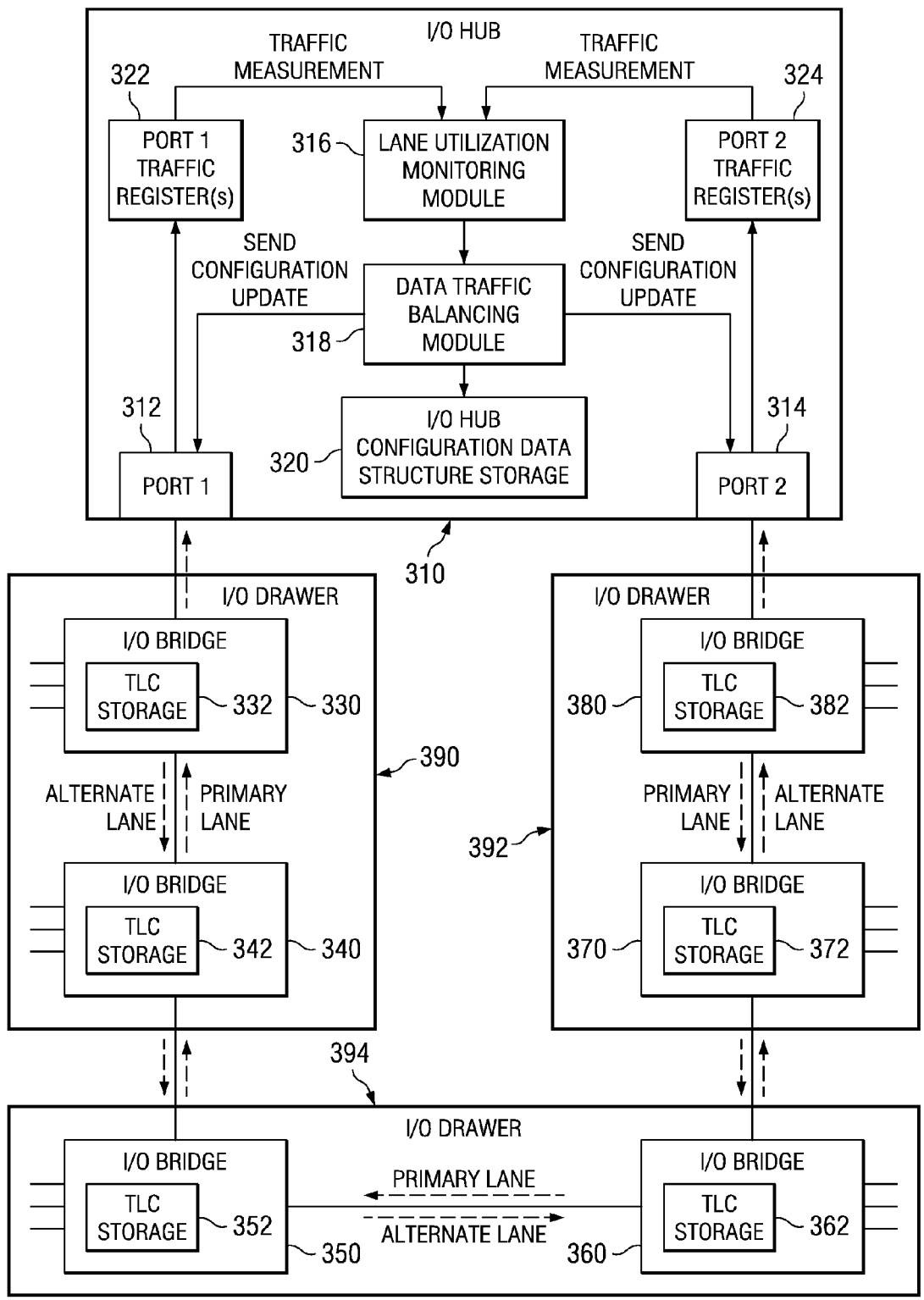
FIG. 3 is a block diagram of the primary operational elements of an I/O hub and I/O bridge loop in accordance with one illustrative embodiment.

FIG. 3 is a block diagram of the primary operational elements of an I/O hub and I/O bridge loop in accordance with one illustrative embodiment. As shown in FIG. 3, the I/O bridge loop comprises an I/O hub 310 and a plurality of I/O bridges 330-380 provided in a plurality of I/O drawers 390-394. The I/O hub 310 comprises a plurality of ports 312 and 314 through which data flows to and from the I/O bridges 330-380. Port traffic registers 322 and 324 are provided for storing information identifying an amount of data transferred to/from the I/O bridges 330-380 via an associated port. For example, the port traffic registers 322 and 324 may constitute counters that store a number of 64 Byte packet blocks that have been transferred through the associated port in a particular time period. The values stored in these port traffic registers 322 and 324 may be initialized periodically, such as following a traffic balancing operation in accordance with the illustrative embodiments, so as to continue to monitor an amount of data flowing through the associated ports.

Also provided in the I/O hub 310 is a lane utilization monitoring module 316, a data traffic balancing module 318, and an I/O hub configuration data structure storage device 320. The lane utilization monitoring module 316 monitors the amount of data flow through the ports 312 and 314 based on the data traffic measurement information obtained from the port traffic registers 322 and 324. As illustrated in FIG. 3, each port 312 and 314 is associated with a different data lane or data pathway through the I/O bridge loop. For example, data flowing from the I/O bridges 330-380 into port 1 312 constitutes a primary data lane through which data may be sent from the I/O bridges 330-380 to the I/O hub 310. Similarly, data may be sent from the I/O hub to the I/O bridges 330-380 via port 1 312 along this primary data lane. Data flowing from the I/O bridges 330-380 into port 2 314 constitutes an alternate data lane through which data may be sent from the I/O bridges 330-380 to the I/O hub 310. Similarly, data may be sent from the I/O hub to the I/O bridges 330-380 via port 2 314 along this alternate data lane. Thus, by monitoring the data flow through the ports 312 and 314, one can determine the utilization of each of the primary and alternate data lanes.

Based on the amount of data flow through the ports 312 and 314, the lane utilization monitoring module 316 determines if the amount of data flow for each of the primary and alternate lanes or pathways exceeds one or more predetermined thresholds. If the data flow through the ports 312 and 314 exceeds a predetermined threshold, the lane utilization monitoring module 316 identifies the I/O bridges 330-380 that are furthest from the ports 312 and 314 that have data traffic that exceeds the one or more thresholds. The lane utilization monitoring module 316 then sends a notification to the data traffic balancing module 318 to perform balancing of the data traffic across the data lanes. This notification may identify which lanes of data traffic have data flow measurements that exceed the one or more predetermined thresholds and identifies which I/O bridges 330-380 are furthest away from the ports 312 and 314 associated with the lanes of data traffic that have data flow measurements that exceed the one or more predetermined thresholds.

The data traffic balancing module 318 determines if zero, one, or both of the lanes of data traffic are over-utilized, i.e. their data flow measurements exceed one or more predetermined thresholds. Based on this determination, one or more data traffic balancing operations may be performed. If both lanes of data traffic are over-utilized, or if neither lane of data traffic has a data flow measurement that exceeds a predetermined threshold, then a predetermined wait time period may be allowed to expire before the data traffic balancing check, based on the data flow measurements of the ports 312 and 314, may be performed again.

If one lane of data traffic is not over-utilized but the other is over-utilized, then an I/O bridge furthest from the port 312 or 314 associated with the over-utilized lane of data traffic, and which is currently flowing data to/from the I/O hub 310 along the over-utilized lane of data traffic, may be reconfigured to transmit its data via the other lane of data traffic. The "furthest away" I/O bridge may be determined based on information obtained during initialization of the I/O hub and I/O bridges. Essentially, at initialization time, the I/O hub 310 "walks" the I/O bridge loop starting form the first logical port of the I/O hub 310. The I/O hub 310 continues "walking" from I/O bridge to I/O bridge until it detects the other port of the I/O hub 310, i.e. the end of the loop. During this sequence, the I/O hub keeps track of the place in line of each of the I/O bridges and how many "hops" it takes that I/O bridge to send data back to the I/O hub 310. This information is maintained in the I/O hub configuration data structure storage device 320. As a result, the I/O hub 310 can determine how far away a particular I/O bridge is from a port of the I/O hub 310 based on the Node ID and this configuration information. A convention may be utilized such that Node IDs are assigned to I/O bridges in an increasing incremental manner, e.g., a first I/O bridge given a Node ID of "2", a second I/O bridge given a Node ID of "3", and so on, such that the Node ID with the largest value in the Node ID is the furthest away from its originating port on the I/O hub 310.

The reconfiguration may comprise the data traffic balancing module 318 updating configuration information in the I/O hub configuration data structure storage device 320 of the I/O hub 310 and/or the traffic lane configuration (TLC) storage devices 332-382 of the I/O bridges 330-380. For example, each I/O hub and I/O bridge may contain a routing table for each node identifier. Within the routing tables there is a software/hardware writable value that informs the I/O hub or bridge which port to use to send data to a particular node identifier. It is these routing tables that may be updated to reconfigure the way in which data is transmitted. In this way, data flows may be redirected between the I/O hub 310 and the I/O bridge furthest away from the port 312 or 314 associated with the over-utilized lane of data traffic, to be along the other lane of data traffic that is under-utilized. This process may be repeated until a condition where either both or neither of the lanes of data traffic are over-utilized.

For example, either continuously, periodically, in response to a user input, or in response to the occurrence of an event, the lane utilization monitoring module 316 may retrieve information from the port traffic registers 322 and 324. The utilization of the data traffic lanes is calculated based on the information retrieved from the port traffic registers 322 and 324. That is, knowing the designed bandwidth of the data traffic lanes, the actual amount of data traffic flowing through the ports, as determined from the information retrieved from the port traffic registers 322 and 324, may be compared to the designed bandwidth to determine an amount of utilization. For example, it may be determined that 56%, 75%, 80%, or the like, of the designed bandwidth is being utilized by the data flows through the ports 312 and 314.

This utilization measure may be compared to one or more predetermined thresholds. For example, the utilization measures may be compared against a 75% utilization threshold such that if a port is utilizing 80% of the designed bandwidth of the data traffic lane, then an over-utilization condition may be detected. If a particular data traffic lane is determined to be over-utilized, then the Node IDs for the I/O bridges, e.g., I/O bridges 330-380, that are currently flowing data along the over-utilized data traffic lane are identified by the lane utilization monitoring module 316. The lane utilization monitoring module 316 may further determine which of the I/O bridges, e.g., I/O bridge 350, that is utilizing the over-utilized data traffic lane, is furthest from the port, e.g., port 312. This information may be provided to the data traffic balancing module 318 which then reconfigures the I/O bridge 350 to send and receive data via the other data traffic lane, e.g., the alternate data traffic lane, to the other port 314.

It should be appreciated that while the above description indicates that data flows from I/O bridges are reassigned in response to detected over-utilization of data traffic lanes, the present invention is not limited to such. Rather, since each I/O slot in an I/O drawer has its own Node ID, the data flow from individual I/O slots may be redirected using the mechanisms of the illustrative embodiments. In this way, each I/O drawer may send/receive data via either or both of the data traffic lanes available via the I/O bridge loop.

In addition, while I/O drawers having only two I/O bridges are shown in FIG. 3, each I/O drawer may have any number of I/O bridges without limitation. That is, each I/O drawer may have one or more I/O bridges and are not limited to use of only two I/O bridges. Moreover, while only two data traffic lanes are illustrated in FIG. 3, the present invention is not limited to such. To the contrary, any number of data traffic lanes may be considered by the mechanisms of the illustrative embodiments. Moreover, an I/O bridge loop configuration, as shown in FIG. 3, is not required for the mechanisms of the illustrative embodiments to be operational.

It should be appreciated that the various elements of the I/O hub 310 and the I/O bridges 330-380 may be implemented in hardware, software, firmware, or any combination of hardware, software, and firmware. In one illustrative embodiment, the lane utilization monitoring module 316 and data traffic balancing module 318 are implemented in firmware while the other elements of the I/O hub 310 are implemented in hardware. Alternatively, the lane utilization monitoring module 316 and data traffic balancing module 318 may be implemented in hardware devices of the I/O hub 310 in an alternative embodiment.

Moreover, while FIG. 3 illustrates the lane utilization monitoring module 316 and the data traffic balancing module 318 as separate modules within the I/O hub 310, the present invention is not limited to such. Rather, these modules may be combined into a single module or may be separated into additional modules without departing from the spirit and scope of the present invention. Furthermore, these modules 316 and 318 need not be implemented as part of the I/O hub 310 and may be performed in a separate device that has access to data flow measurement information for the ports of the I/O hub 310.

Figure 4:
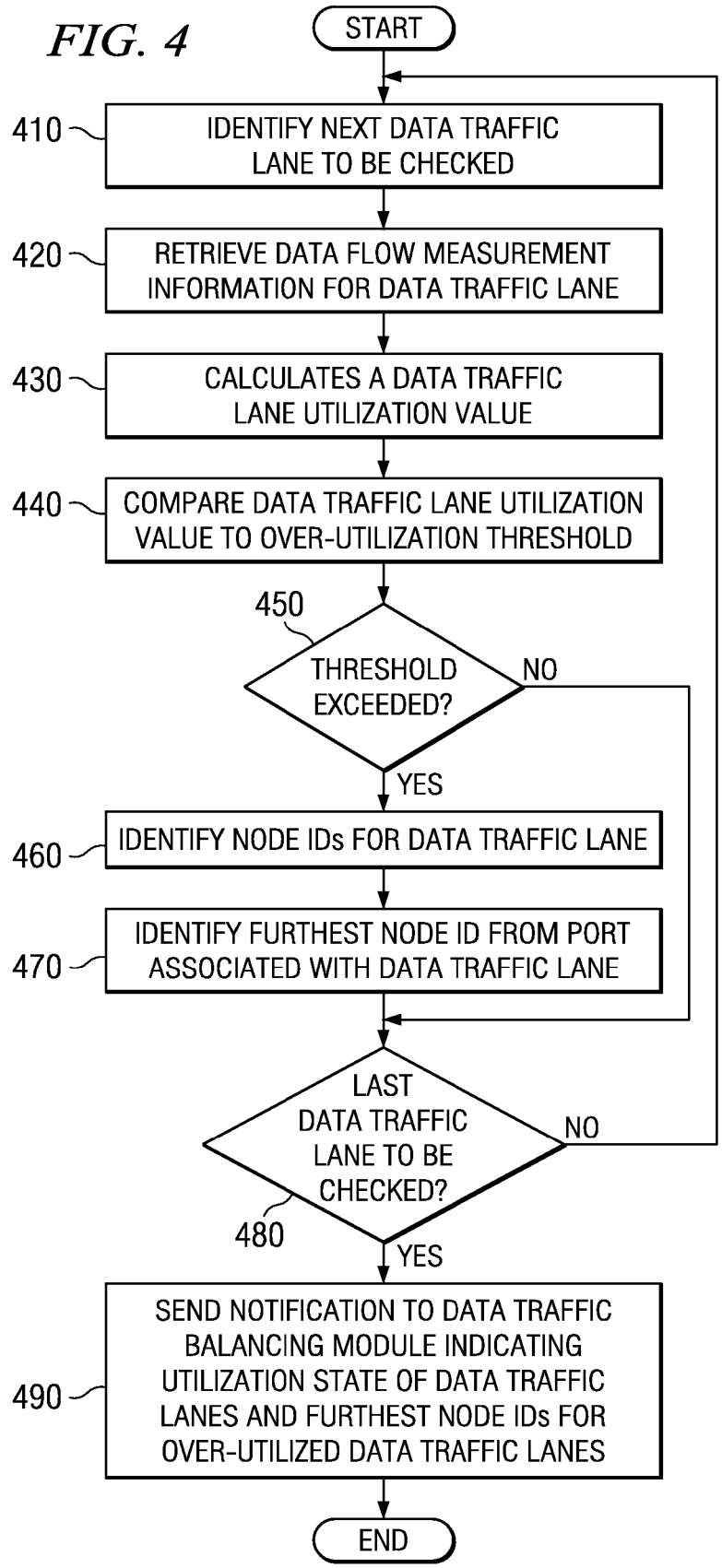
FIG. 4 is a flowchart outlining an exemplary operation for determining a data traffic load of a port of an I/O hub and determining I/O bridges farthest from overloaded ports in accordance with one illustrative embodiment.
Figure 5:
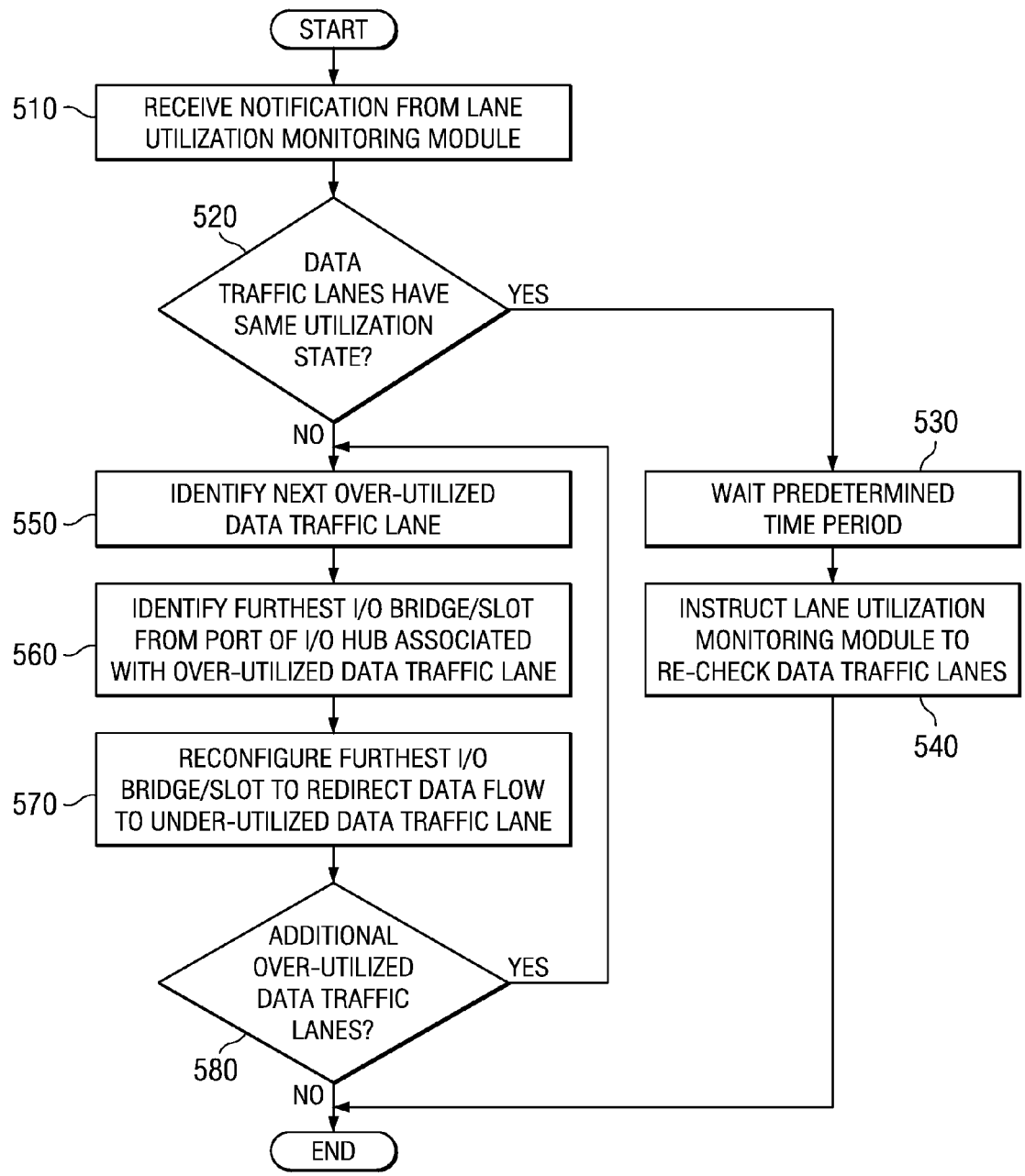
FIG. 5 is a flowchart outlining an exemplary operation for rerouting data traffic from the furthest I/O bridges of overloaded ports to alternate ports in accordance with one illustrative embodiment.

FIGS. 4 and 5 are flowcharts outlining exemplary operations for performing data traffic balancing across data traffic lanes between a plurality of I/O bridges and an I/O hub in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 4 is a flowchart outlining an exemplary operation for determining a data traffic load of a port of an I/O hub and determining I/O bridges farthest from overloaded ports in accordance with one illustrative embodiment. As shown in FIG. 4, the operation starts with the lane utilization monitoring module identifying a next data traffic lane to be checked (step 410). The lane utilization monitoring module retrieves data flow measurement information for the data traffic lane (step 420) and calculates a data traffic lane utilization value (step 430). The data traffic lane utilization value is compared against an over-utilization threshold (step 440).

The lane utilization monitoring module determines whether the data traffic lane utilization value exceeds the over-utilization threshold based on the results of the comparison (step 450). If the lane utilization monitoring module determines that the data traffic lane utilization value does exceed the over-utilization threshold, the lane utilization monitoring module identifies the Node IDs for the I/O bridges/slots flowing data to/from the I/O hub along the data traffic lane (step 460). The lane utilization monitoring module then identifies which of these Node IDs corresponds to the I/O bridge/slot that is furthest from the port associated with the data traffic lane (step 470).

Thereafter, or if the data traffic utilization value does not exceed the over-utilization threshold, the lane utilization monitoring module determines if this is the last data traffic lane to be checked (step 480). If not, the operation returns to step 410. If this is the last data traffic lane to be checked, the lane utilization monitoring module sends a notification to the data traffic balancing module indicating the status of the data traffic lanes, i.e. either over-utilized or under-utilized, and which Node IDs correspond to the I/O bridges/slots furthest away from the corresponding ports of the I/O hub (step 490). The operation then terminates.

FIG. 5 is a flowchart outlining an exemplary operation for rerouting data traffic from the furthest I/O bridges of overloaded ports to alternate ports in accordance with one illustrative embodiment. As shown in FIG. 5, the operation starts with the data traffic balancing module receiving a notification from the lane utilization monitoring module (step 510). The notification is parsed by the data traffic balancing module to determine if all of the data traffic lanes have a same state of utilization, i.e. all data traffic lanes are under-utilized or all data traffic lanes are over-utilized (step 520). If all of the data traffic lanes have the same state of utilization, the data traffic balancing module waits a predetermined time period (step 530) and then sends an instruction to the lane utilization monitoring module to re-check the utilization of the data traffic lanes (step 540). The operation then terminates.

If one of the data traffic lanes has a different state of utilization from the other data traffic lanes, the next over-utilized data traffic lane is identified by the data traffic balancing module (step 550). The data traffic balancing module then determines the furthest I/O bridge/slot from the port of the I/O hub associated with the data traffic lane that is over-utilized (step 560). The data traffic balancing module then reconfigures the furthest I/O bridge/slot to redirect its data flow to another of the data traffic lanes that is under-utilized (step 570).

The data traffic balancing module determines if there are more over-utilized data traffic lanes indicated in the notification from the lane utilization monitoring module (step 580). If there are additional over-utilized data traffic lanes, the operation returns to step 550. If there are no additional over-utilized data traffic lanes indicated, the operation terminates.

Thus, the mechanisms of the illustrative embodiments provide functionality for monitoring the data flow through I/O bridges to an I/O hub, such as through an I/O bridge loop. The mechanisms of the illustrative embodiments provide a functionality for redirecting data flows based on a determined current data traffic condition such that the data traffic load may be distributed over the available data traffic lanes. In this way, the maximum amount of performance bandwidth is achieved at all times of operation.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing device, for balancing data traffic across a plurality of data traffic lanes, comprising:
    retrieving, at an input/output (I/O) hub, data traffic measurement information for a plurality of ports of the I/O hub;
    determining, by the I/O hub, if a data traffic lane is over-utilized based on the retrieved data traffic measurement information;
    identifying, by the I/O hub, at least one I/O bridge associated with an over-utilized data traffic lane, in response to a determination that a data traffic lane is over-utilized, which can be reconfigured to direct data flow to an under-utilized data traffic lane of the plurality of data traffic lanes; and
    reconfiguring, by the I/O hub, the at least one I/O bridge associated with the over-utilized data traffic lane to utilize a different data traffic lane in response to identifying the at least one I/O bridge,
    wherein the at least one I/O bridge is part of a plurality of I/O bridges coupled to the I/O hub in a loop configuration such that each I/O bridge is coupled to at least one other I/O bridge in the plurality of I/O bridges,
    wherein identifying at least one I/O bridge associated with an over-utilized data traffic lane which can be reconfigured to direct data flow to an under-utilized data traffic lane of the plurality of data traffic lanes comprises:
    identifying I/O bridges utilizing the over-utilized traffic lane to communicate with the I/O hub; and
    identifying an I/O bridge that is furthest away from a port of the I/O hub utilizing the over-utilized data traffic lane, and wherein reconfiguring the at least one I/O bridge comprises reconfiguring the I/O bridge that is furthest away from the port of the I/O hub utilizing the over-utilized data traffic lane to use the different data traffic lane.

2. The method of claim 1, wherein the plurality of data traffic lanes comprises a first traffic lane in which data flows from a first port of the plurality of ports in a first direction through the loop configuration to a second port of the plurality of ports, and wherein the plurality of data traffic lanes comprises a second traffic lane in which data flows from the second port in a second direction opposite the first direction through the loop configuration to the first port of the plurality of ports.

3. The method of claim 1, wherein:
    the at least one I/O bridge is part of a plurality of I/O bridges coupled to the I/O hub,
    each I/O bridge in the plurality of I/O bridges provides at least one I/O slot through which data may be communicated to and from an I/O device,
    each I/O slot is assigned a node identifier that informs the I/O hub which data traffic lane of the plurality of data traffic lanes to use in order to communicate data between the I/O slot and the I/O hub.

4. The method of claim 3, wherein identifying at least one I/O bridge associated with an over-utilized data traffic lane which can be reconfigured to direct data flow to an under-utilized data traffic lane of the plurality of data traffic lanes comprises:
    identifying I/O bridges utilizing the over-utilized data traffic lane to communicate with the I/O hub based on the node identifiers of the I/O slots; and
    identifying an I/O bridge that is furthest away from a port of the I/O hub associated with the over-utilized data traffic lane based on the node identifiers of the I/O slots, and wherein reconfiguring the at least one I/O bridge comprises reconfiguring one of the I/O bridge that is furthest away from the port of the I/O hub associated with the over-utilized data traffic lane to use the different data traffic lane or one or more I/O slots of the I/O bridge that is furthest away from the port of the I/O hub associated with the over-utilized data traffic lane to use the different data traffic lane.

5. The method of claim 1, wherein the plurality of data traffic lanes comprises a first data traffic lane and a second data traffic lane, and wherein determining if a data traffic lane is over-utilized based on the retrieved data traffic measurement information comprises determining if zero, one, or both of the first data traffic lane and the second data traffic lane are over-utilized, and wherein if zero or both of the first data traffic lane and the second data traffic lane are over-utilized, the identifying and reconfiguring operations are not performed.

6. The method of claim 1, wherein determining if a data traffic lane is over-utilized comprises comparing the retrieved data traffic measurement information to one or more threshold values, and wherein if the retrieved data traffic measurement information exceeds a threshold of the one or more threshold values, it is determined that the data traffic lane is over-utilized.

7. The method of claim 1, wherein reconfiguring the at least one I/O bridge comprises updating a routing table data structure in at least one of the at least one I/O bridge or the I/O hub to cause the at least one I/O bridge to use the different data traffic lane.

8. A data processing system, comprising:
    an input/output (I/O) hub having a plurality of ports, wherein the I/O hub comprises a data traffic monitoring module and a data traffic balancing module; and
    a plurality of I/O bridges coupled to the plurality of ports of the I/O hub, wherein:
    the data traffic monitoring module retrieves data traffic measurement information for the plurality of ports of the I/O hub,
    the data traffic monitoring module determines if a data traffic lane, of a plurality of data traffic lanes, is over-utilized based on the retrieved data traffic measurement information,
    the data traffic balancing module identifies at least one I/O bridge associated with an over-utilized data traffic lane, in response to a determination that a data traffic lane is over-utilized by the data traffic monitoring module, which can be reconfigured to direct data flow to an under-utilized data traffic lane of the plurality of data traffic lanes, and
    the data traffic balancing module reconfigures the at least one I/O bridge associated with the over-utilized data traffic lane to utilize a different data traffic lane in response to identifying the at least one I/O bridge, wherein the plurality of I/O bridges are coupled to the I/O hub in a loop configuration such that each I/O bridge is coupled to at least one other I/O bridge in the plurality of I/O bridges, wherein the data traffic monitoring module identifies at least one I/O bridge associated with an over-utilized data traffic lane which can be reconfigured to direct data flow to an under-utilized data traffic lane of the plurality of data traffic lanes by:

identifying I/O bridges utilizing the over-utilized data traffic lane to communicate with the I/O hub; and identifying an I/O bridge that is furthest away from a port of the I/O hub utilizing the over-utilized data traffic lane, and wherein the data traffic balancing module reconfigures the at least one I/O bridge by reconfiguring the I/O bridge that is furthest away from the port of the I/O hub utilizing the over-utilized data traffic lane to use the different data traffic lane.

9. The system of claim 8, wherein the plurality of data traffic lanes comprises a first traffic lane in which data flows from a first port of the plurality of ports in a first direction through the loop configuration to a second port of the plurality of ports, and wherein the plurality of data traffic lanes comprises a second traffic lane in which data flows from the second port in a second direction opposite the first direction through the loop configuration to the first port of the plurality of ports.

10. The system of claim 8, wherein:

each I/O bridge in the plurality of I/O bridges provides at least one I/O slot through which data may be communicated to and from an I/O device, each I/O slot is assigned a node identifier that informs the I/O hub which data traffic lane of the plurality of data traffic lanes to use in order to communicate data between the I/O slot and the I/O hub.

11. The system of claim 10, wherein the data traffic monitoring module identifies at least one I/O bridge associated with an over-utilized data traffic lane which can be reconfigured to direct data flow to an under-utilized data traffic lane of the plurality of data traffic lanes by:

identifying I/O bridges utilizing the over-utilized data traffic lane to communicate with the I/O hub based on the node identifiers of the I/O slots; and identifying an I/O bridge that is furthest away from a port of the I/O hub associated with the over-utilized data traffic lane based on the node identifiers of the I/O slots, and wherein the data traffic balancing module reconfigures the at least one I/O bridge by reconfiguring one of the I/O bridge that is furthest away from the port of the I/O hub associated with the over-utilized data traffic lane to use the different data traffic lane or one or more I/O slots of the I/O bridge that is furthest away from the port of the I/O hub associated with the over-utilized data traffic lane to use the different data traffic lane.

12. The system of claim 8, wherein the plurality of data traffic lanes comprises a first data traffic lane and a second data traffic lane, and wherein the data traffic monitoring module determines if a data traffic lane is over-utilized based on the retrieved data traffic measurement information by determining if zero, one, or both of the first data traffic lane and the second data traffic lane are over-utilized, and wherein if zero or both of the first data traffic lane and the second data traffic lane are over-utilized, the identifying and reconfiguring operations are not performed.

13. The system of claim 8, wherein the data traffic monitoring module determines if a data traffic lane is over-utilized by comparing the retrieved data traffic measurement information to one or more threshold values, and wherein if the retrieved data traffic measurement information exceeds a threshold of the one or more threshold values, it is determined that the data traffic lane is over-utilized.

14. The system of claim 8, wherein the data traffic balancing module reconfigures the at least one I/O bridge by updating a routing table data structure in at least one of the at least one I/O bridge or the I/O hub to cause the at least one I/O bridge to use the different data traffic lane.

15. A computer program product comprising a computer recordable medium having a computer readable program recorded thereon, wherein the computer readable program, when executed on a computing device, causes the computing device to:

retrieve, at an input/output (I/O) hub, data traffic measurement information for a plurality of ports of the I/O hub;

determine, by the I/O hub, if a data traffic lane, of a plurality of data traffic lanes, is over-utilized based on the retrieved data traffic measurement information;

identify, by the I/O hub, at least one I/O bridge associated with an over-utilized data traffic lane, in response to a determination that a data traffic lane is over-utilized, which can be reconfigured to direct data flow to an under-utilized data traffic lane of the plurality of data traffic lanes; and reconfigure, by the I/O hub, the at least one I/O bridge associated with the over-utilized data traffic lane to utilize a different data traffic lane in response to identifying the at least one I/O bridge, wherein the at least one I/O bridge is part of a plurality of I/O bridges coupled to the I/O hub in a loop configuration such that each I/O bridge is coupled to at least one other I/O bridge in the plurality of I/O bridges, wherein identifying at least one I/O bridge associated with an over-utilized data traffic lane which can be reconfigured to direct data flow to an under-utilized data traffic lane of the plurality of data traffic lanes comprises:

identifying I/O bridges utilizing the over-utilized data traffic lane to communicate with the I/O hub; and identifying an I/O bridge that is furthest away from a port of the I/O hub utilzing the over-utilized data traffic lane, and wherein reconfiguring the at least one I/O bridge comprises reconfiguring the I/O bridge that is furthest away from the port of the I/O hub utilizing the over-utilized data traffic lane to use the different data traffic lane.

* * * * *